United States Patent
Miyachi

(10) Patent No.: US 12,286,000 B2
(45) Date of Patent: Apr. 29, 2025

(54) TARPAULIN HOUSING STRUCTURE FOR VEHICLE

(71) Applicant: TOYOTA JIDOSHA KABUSHIKI KAISHA, Toyota Aichi-ken (JP)

(72) Inventor: Shigenobu Miyachi, Nisshin (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 198 days.

(21) Appl. No.: 18/129,990

(22) Filed: Apr. 3, 2023

(65) Prior Publication Data

US 2023/0322056 A1    Oct. 12, 2023

(30) Foreign Application Priority Data

Apr. 8, 2022    (JP) .................................. 2022-064490

(51) Int. Cl.
    *B60J 7/08*    (2006.01)
(52) U.S. Cl.
    CPC .................... *B60J 7/085* (2013.01)
(58) Field of Classification Search
    USPC ............ 296/98, 99.1, 152; 135/88.01, 88.07, 135/88.03
    See application file for complete search history.

(56) References Cited

U.S. PATENT DOCUMENTS

| | | | | |
|---|---|---|---|---|
| 2,788,791 A | * | 4/1957 | Pospisil | E04H 15/06 135/904 |
| 5,339,851 A | * | 8/1994 | Miller | B60P 7/04 296/105 |
| 7,281,752 B2 | * | 10/2007 | Wiegel | B60J 11/02 296/98 |
| 8,662,563 B1 | * | 3/2014 | Hardenbrook | E04H 15/08 135/88.07 |
| 11,214,131 B2 | * | 1/2022 | Sorias | B60J 5/0494 |
| 2016/0318381 A1 | * | 11/2016 | Camps | B60J 7/085 |
| 2020/0062091 A1 | * | 2/2020 | Kao | B60J 7/0015 |

FOREIGN PATENT DOCUMENTS

| | | | | | |
|---|---|---|---|---|---|
| CN | 109515130 A | * | 3/2019 | ............ | B60J 5/0494 |
| CN | 110065370 A | * | 7/2019 | ............ | B60J 11/025 |
| CN | 110466332 A | * | 11/2019 | | |
| CN | 111762008 A | * | 10/2020 | ............ | B60J 5/0494 |
| DE | 4430525 A1 | * | 2/1996 | ............ | B60J 11/02 |
| JP | 2015-123960 A | | 7/2015 | | |
| JP | 2019-172020 A | | 10/2019 | | |
| KR | 2006067644 A | * | 6/2006 | | |
| KR | 2007111781 A | * | 11/2007 | ............ | B60J 5/0494 |

* cited by examiner

Primary Examiner — Amy R Weisberg
Assistant Examiner — Veronica M Schull
(74) Attorney, Agent, or Firm — Dinsmore & Shohl LLP

(57) ABSTRACT

A joint groove is defined in a joint section of a roof structure and a side body structure of a vehicle. A roof rail having a hollow structure is fixed to the vehicle so as to extend along the joint groove. A housing space for housing a tarpaulin is cooperatively defined by both the roof rail and the joint groove. Greater housing space can be more easily secured as compared to a case in which the housing space is defined solely by the roof rail.

5 Claims, 4 Drawing Sheets

TARPAULIN HOUSING STRUCTURE FOR VEHICLE

CROSS REFERENCE TO RELATED APPLICATION

This application claims priority to Japanese Patent Application No. 2022-064490 filed on Apr. 8, 2022, which is incorporated herein by reference in its entirety including the specification, claims, drawings, and abstract.

TECHNICAL FIELD

The present disclosure relates to a housing structure for a tarpaulin which is expanded over a laterally adjacent region beside a vehicle when in use.

BACKGROUND

Various suggestions have been made for tarpaulins which can be expanded over a laterally adjacent region beside a vehicle to function as a rain shield for passengers entering or exiting the vehicle. Below-listed Patent Document 1 discloses a rain shield device including an elastic and flexible tarpaulin (rain shielding sheet A) which is attached on its one side to an upper side edge (10) of a vehicle body and attached on the other side to an upper edge (16) of a front door. When the front door is opened, the tarpaulin (rain shielding sheet A) is expanded and spread over a region laterally adjacent to the vehicle, to function as a rain shield. It should be noted that the component name and reference signs within parentheses above are used only in Patent Document 1, and are not related to component names or reference signs used in the following description for explaining embodiments of this application.

CITATION LIST

Patent Literature

Patent Document 1: JP 2019-172020 A

Even for expandable tarpaulins, it is difficult to ensure that closing the front door does not cause the tarpaulin to sag. A sagging tarpaulin has a negative effect on the appearance of a vehicle.

An object of the present disclosure is to preserve a desirable outer appearance of a vehicle when a tarpaulin mounted on the vehicle is not used.

SUMMARY

A tarpaulin housing structure for a vehicle according to an aspect of this disclosure includes an expandable tarpaulin configured to be expanded above a laterally adjacent region beside the vehicle after the tarpaulin is drawn out from a rolled up state, a vehicle body on which a joint groove is formed in a joint section of a roof structure and a side body structure, and a roof rail extending along the joint groove and having a hollow structure, the roof rail being fixed to the vehicle body, in which the roof rail and the joint groove cooperatively define a housing space to house the rolled up tarpaulin.

When the housing space is cooperatively defined by both the roof rail and the joint groove, it becomes possible to easily secure a size of the housing space that is greater than a housing space that is solely defined by the roof rail.

In another aspect of this disclosure, the tarpaulin housing structure for a vehicle may further include a flexible roll up shaft around which the tarpaulin is rolled up, and the roll up shaft may be placed within the housing space in a state of being curved through flexure.

In this way, the tarpaulin can be housed in the tarpaulin housing structure even when the roof rail has a curved shape.

BRIEF DESCRIPTION OF DRAWINGS

Embodiments of the present disclosure will be described based on the following figures, wherein.

DESCRIPTION OF EMBODIMENTS

Figure 1:
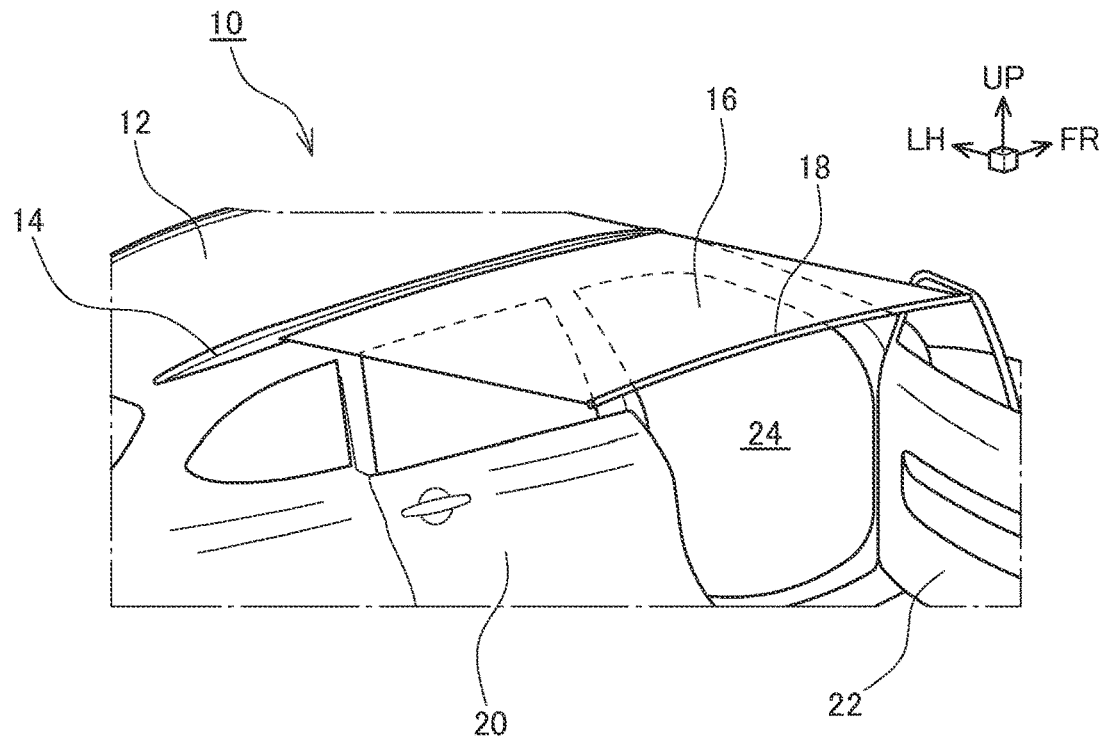
FIG. 1 is a perspective view schematically showing a vehicle according to an embodiment.

Hereinafter, an embodiment according to the present disclosure will be explained with reference to the drawings. In the description below, terms representing relative positions, directions, and orientations, such as front, forward, rear, rearward, left, leftward, right, rightward, top, upward, bottom, and downward, are used to denote relative positions, directions, and orientations with respect to a vehicle unless otherwise specified. Further, a front and rear direction of the vehicle is described as a longitudinal direction, a right and left direction of the vehicle is described as a lateral direction, and a top and bottom direction of the vehicle is described as a vertical direction. Still further, the portion of the lateral direction of the vehicle (a vehicle width direction) closer to a centerline extending along the longitudinal direction of the vehicle is referred to as an inner side in the vehicle width direction, and the portion of the lateral direction farther from the centerline is referred to as an outer side, while a direction toward the centerline is referred to as an inward direction in the vehicle width direction, and a direction leaving away from the centerline is referred to as an outward direction. In the drawings, an arrow FR indicates a forward direction, an arrow UP indicates an upward direction, an arrow LH indicates a leftward direction, and an arrow OUT indicates an outward direction in the vehicle width direction.

FIG. 1 is a perspective view schematically showing a vehicle 10 according to this disclosure. A roof rail 14 extending along the longitudinal direction is disposed on both right and left side edges of a roof structure 12 which constitutes a part of a body of the vehicle 10. The vehicle 10 is equipped with a tarpaulin 16 which functions as both a rain shield and a sun shield. The tarpaulin 16 is housed in the roof rail 14 when it is not used, and, when the tarpaulin 16 is used, it is drawn out from the roof rail 14 and expanded above a laterally adjacent region beside the vehicle 10 as shown in FIG. 1. An end bar 18 is fixed to a lateral end of the tarpaulin 16, and the tarpaulin 16 having been drawn out is maintained in a state of being extended along the longitudinal direction.

A front edge of the tarpaulin 16 on the vehicle 10 is located at a position shifted slightly rearward from a front edge of the roof structure 12, and a rear edge of the tarpaulin 16 is located at a position shifted slightly rearward from a rear edge of a rear door 20. The tarpaulin 16 is able to provide cover above approximately the rear half of a lateral outside region corresponding to an opening 24 that emerges when a front door 22 is opened. Therefore, when it is raining, the tarpaulin 16 can protect at least the upper half of the body of a person attempting to boarding or exiting from a front seat from being soaked by the rain. For a person boarding or exiting from a rear seat, the tarpaulin 16 is able to provide cover above an entire lateral outside region corresponding to an opening that emerges when the rear door 20 is opened.

Figure 2:
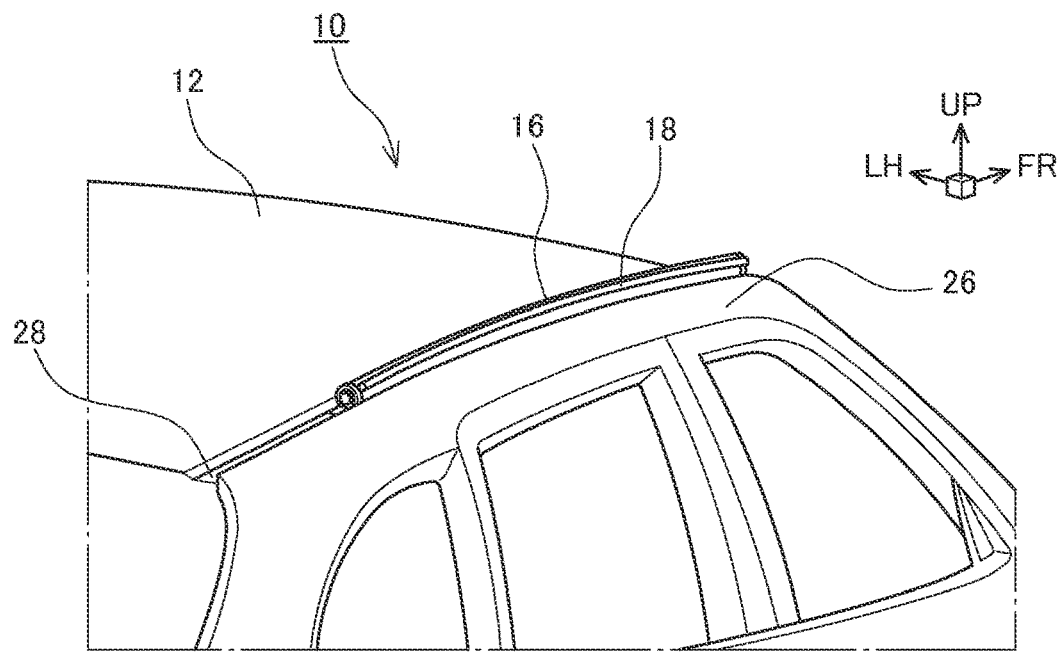
FIG. 2 is a perspective view showing the vehicle of FIG. 1 in a state where a roof rail is removed.

FIG. 2 is a schematic perspective view showing the vehicle 10 on which the tarpaulin 16 is rolled up, in a state in which the roof rail 14 is removed. The roof structure 12 is joined at its side edge to a side body structure 26 constituting a part of the vehicle body. A groove is formed in a joint section of the roof structure 12 and the side body structure 26. The roof structure 12 and the side structure 26 are joined to each other at the bottom of the groove. Hereinafter, this groove in the joint section is referred to as a joint groove 28. The joint groove 28 extends along the longitudinal direction of the vehicle 10, and the roof rail 14 is placed so as to cover the joint groove 28.

Figure 3:
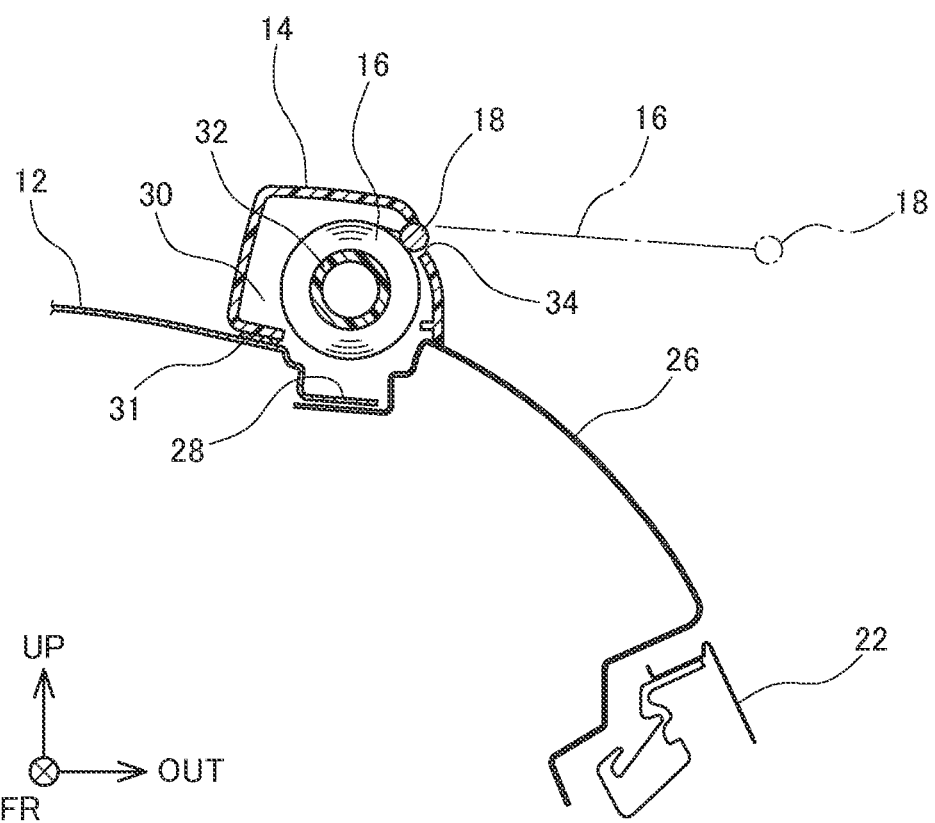
FIG. 3 is a cross sectional view showing the roof rail, a joint groove, and components therearound.

FIG. 3 is a cross sectional view taken along a direction orthogonal to the longitudinal direction and showing the joint groove 28 and components around the joint groove 28. In FIG. 3, only surface members of the roof structure 12 and the side body structure 26 are illustrated, while body frame members of the roof structure 12 and the side body structure 26 are omitted. The roof structure 12 and the side body structure 26 are welded to each other at the bottom of the joint groove 28 by a spot welding technique, for example. The roof rail 14 having a hollow structure is disposed above the joint groove 28. The roof rail 14 and the joint groove 28 cooperatively define a housing space 30 in which the rolled up tarpaulin 16 is housed. An internal space of the roof rail 14 is integrated with a space within the joint groove 28, and a part of a roll composed of the rolled up tarpaulin 16 is also housed in the space within the joint groove 28. The tarpaulin 16 is rolled up around a roll up shaft 32 and formed in the shape of the roll. The roll up shaft 32 has flexibility. The roll up shaft 32 may be formed of a resin material, such as polyvinyl chloride, for example. As will be described below, the roll up shaft 32 is warped in a curved shape and placed within the housing space 30 in that shape.

A slit 34 is defined in a laterally outer surface (a surface on the right side of the diagram in FIG. 3) of the roof rail 14. The tarpaulin 16 is drawn out through the slit 34 from the housing space 30 and retracted through the slit 34 into the housing space 30. When the tarpaulin 16 is fully rolled up, a gap between the top of the rolled up tarpaulin 16 and an upper end of the slit 34 is smaller than a diameter of the end bar 18. Therefore, the end bar 18 is stopped at a position of the gap, to thereby prevent the tarpaulin 16 from being further rolled up. Instead of using an edge of the slit 34 to stop the end bar 18, a protrusion or a projecting strip may be provided close to the slit 34 on an inner wall surface of the roof rail 14 as a stopper for stopping the end bar 18.

The roof rail 14 is fixed to the bottom of the joint groove 28 by bolts at positions located forward and rearward of a region where the tarpaulin 16 is housed in the roof rail 14. Specifically, a fixation block disposed in the inner space of the roof rail 14 and having an erect stud bolt being fixed to the fixation block, and a nut to be engaged with the stud bolt are used for fixing the roof rail 14 to the vehicle body. That is, the stud bolt is inserted through a through hole defined in the bottom of the joint groove 28, to sandwich a member constituting the bottom of the joint groove 28 between the fixation block and the nut, so that the roof rail 14 is fixed onto the vehicle body. The roof rail 14 may be fixed to the vehicle body using two or more sets of the fixation block and the nut at two or more locations spaced along the longitudinal direction. In a region between the locations where the roof rail 14 is fixed by the stud bolts, the roof rail 14 may be fixed to the roof structure 12 using a double-sided adhesive tape 31. The roof rail 14 may be formed of a resin, such as polycarbonate, or ABS resin, for example. Meanwhile, when it is intended that a roof carrier be mounted on the roof rail 14, the roof rail 14 may be partially formed of aluminum in a region where the roof carrier is mounted, to ensure adequate strength of the roof rail 14.

Figure 4:
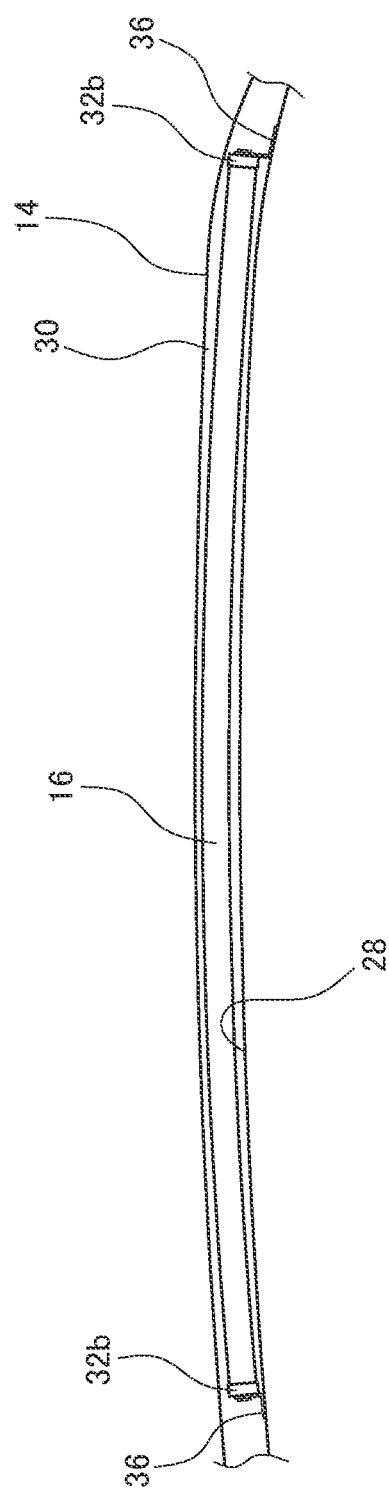
FIG. 4 is a diagram showing the inside of a housing space defined by both the roof rail and the joint groove.
Figure 5:
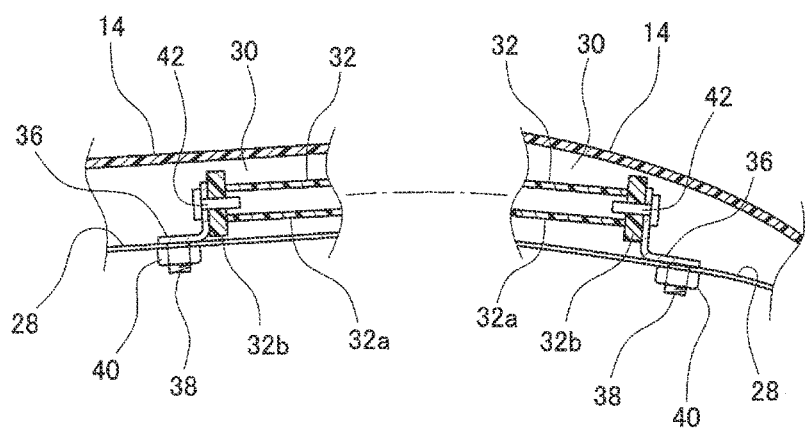
FIG. 5 is a diagram showing a front end and a rear end of a roll up shaft around which a tarpaulin is rolled up, and components around the front and rear ends of the roll up shaft.

FIGS. 4 and 5 are longitudinal sections of the housing space 30 defined by the roof rail 14 and the joint groove 28. FIG. 4 shows the entire roll formed of the tarpaulin 16, and FIG. 5 shows components around a front end and a rear end of the roll. In FIG. 4, the end bar 18 is omitted, and in FIG. 5, the tarpaulin 16 is further omitted.

The roll up shaft 32 has a shaft section 32*a* in the shape of a hollow cylinder and a flange section 32*b* joined to both ends of the shaft section 32*a*. The diameter of the flange sections 32*b* is greater than the diameter of the shaft section 32*a*. A flat spiral spring (not illustrated) is arranged within the shaft section 32*a*, and a spring force of the flat spiral spring is used to roll up the tarpaulin 16. The roll up shaft 32 is rotatably supported by brackets 36 fixed to the bottom of the joint groove 28. Each of the brackets 36 is formed in substantially 'L' shape (the shape of the letter L), and is fixed to the bottom of the joint groove 28 using a bolt 38 attached in an erect position to one of the arms of the L and a nut 40 screwed to the bolt 38. A support pin 42 is attached to the other of the arms of the letter L and is inserted into a central hole in the flange section 32*b*. The roll up shaft 32 is rotatably supported on the support pin 42.

As shown in FIG. 4, the roof rail 14 is curved in the longitudinal direction, and the housing space 30 is accordingly curved in the longitudinal direction. The roll formed by the rolled up tarpaulin 16 is housed within the housing space 30 in a curved state. A distance between the brackets 36 supporting the roll up shaft 32 at its both ends is shorter than the length of the uncurved roll up shaft 32. Therefore, the roll up shaft 32 receives a compressive load from the brackets 36. The compressive load causes the roll up shaft 32 to be flexed to be in the curved state. The roof rail 14 is curved in such a manner as to have a general shape which protrudes upward, and the housing space 30 is accordingly curved in the same manner. Conforming to the curve of the housing space 30, the rolled up tarpaulin 16 is also curved so as to protrude upward. The roll formed of the roll up shaft 32 and the tarpaulin 16 confined in the upwardly curved housing space 30 is caused to maintain its upwardly curved shape while being rotated by an operation to roll up the tarpaulin 16.

The slit 34 in the roof rail 14 is curved along the curved shape of the roof rail 14. For this reason, the end bar 18 is curved so as to be fitted in the curved slit 34. Meanwhile, the end bar 18 may have sufficient flexibility to enable the end bar 18 to be fitted into the curved slit 34 while flexed.

Figure 6:
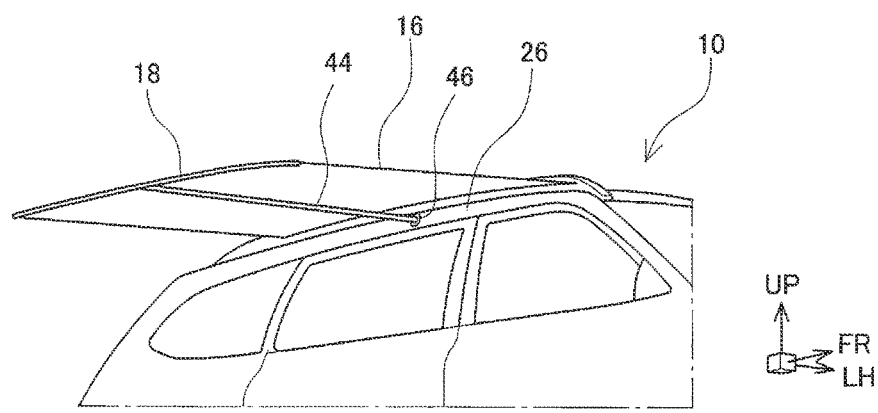
FIG. 6 is a diagram showing an example of a technique for maintaining the tarpaulin in an expanded state.

FIG. 6 shows an example of a technique for maintaining the tarpaulin 16 in an expanded state. A support rod 44 is attached to an upper end, i.e., a so-called side rail, of the side body structure 26, and a tip end of the support rod 44 is brought to abut the end bar 18, to thereby maintain the tarpaulin 16 in the expanded state. The support rod 44 may include a suction cup 46, and the suction cup 46 adhered through suction force to the side body structure 26 retains another end, on a side body structure 26 side, of the support rod 44.

When the housing space 30 for the tarpaulin 16 is defined by the combination of the roof rail 14 and the joint groove 28, it becomes possible to increase the size of the housing space 30 as compared to a case where the housing space 30 is defined solely by the roof rail 14. Increasing the size of the housing space 30 in turn makes it possible to house a larger tarpaulin or thicker tarpaulin in the housing space 30. Alternatively, the roof rail 14 may be decreased in size, i.e., the height of the roof rail 14 may be lowered, while maintaining the size of the housing space 30.

REFERENCE SIGNS LIST

10 vehicle, 12 roof structure, 14 roof rail, 16 tarpaulin, 18 end bar, 26 side body structure, 28 joint groove, 30 housing space, 32 roll up shaft, 34 slit, 36 bracket, 42 support pin.

The invention claimed is:

1. A tarpaulin housing structure for a vehicle, comprising:
an expandable tarpaulin configured to be expanded above a laterally adjacent region beside the vehicle after the tarpaulin is drawn out from a rolled up state;
a vehicle body on which a joint groove is defined in a joint section of a roof structure and a side body structure; and
a roof rail extending along the joint groove and having a hollow structure, the roof rail being fixed to the vehicle body, wherein the roof rail and the joint groove cooperatively define a housing space in which the rolled up tarpaulin is housed.

2. The tarpaulin housing structure for a vehicle according to claim 1, further comprising a flexible roll up shaft around which the tarpaulin is rolled up, wherein the roll up shaft is placed within the housing space in a state being curved due to flexure.

3. The tarpaulin housing structure for a vehicle according to claim 1, wherein the joint groove is recessed into the joint section.

4. The tarpaulin housing structure for a vehicle according to claim 1, wherein the roof structure and the side body structure are joined to each other at a bottom of the joint groove.

5. The tarpaulin housing structure for a vehicle according to claim 1, wherein the roof rail has an open bottom that opens to the joint groove to define the hollow structure.

* * * * *